March 30, 1954

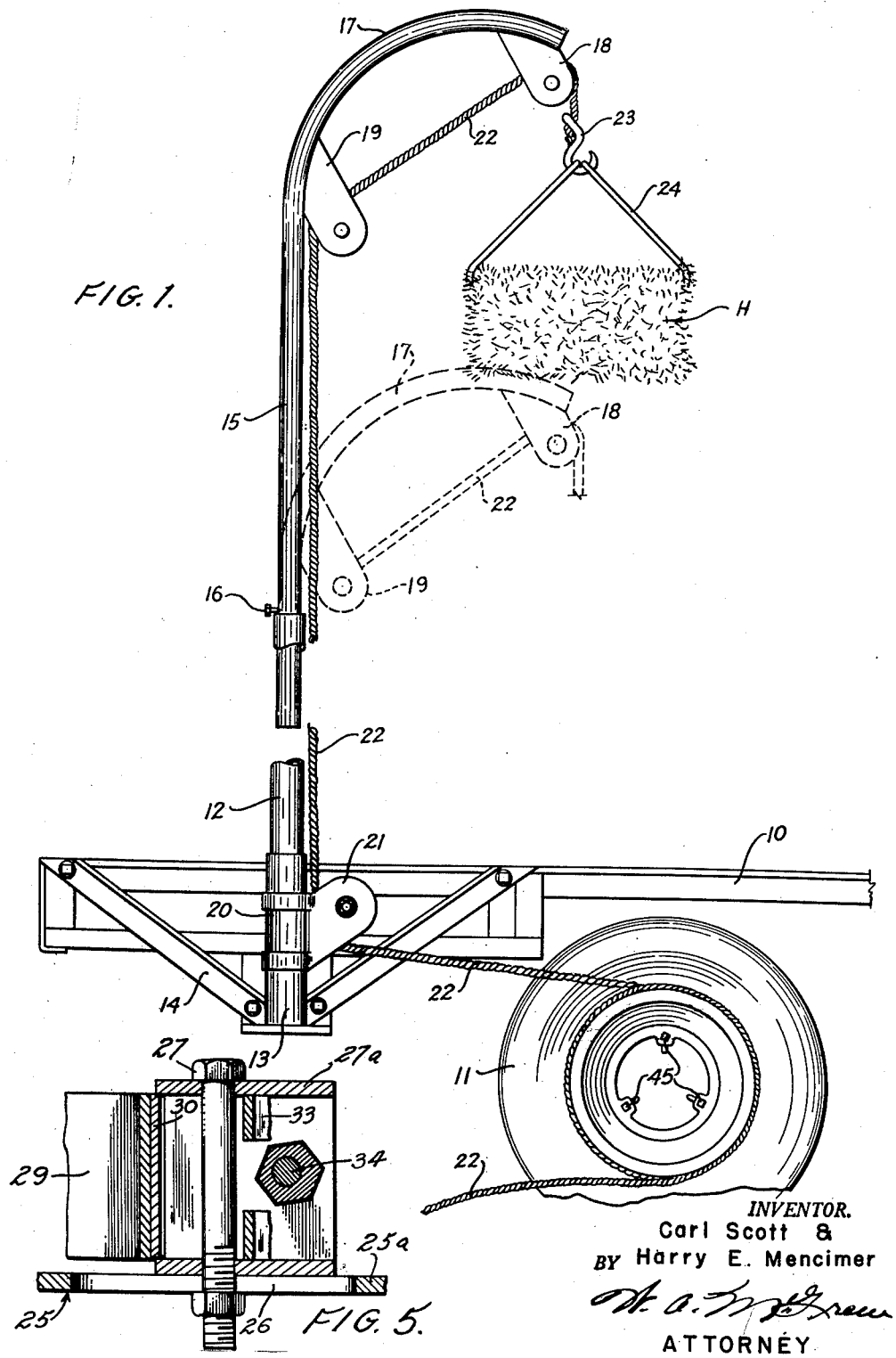

C. SCOTT ET AL 2,673,753

LOADING APPARATUS

Filed Sept. 1, 1949

INVENTOR.
Carl Scott &
BY Harry E. Mencimer

ATTORNEY

Patented Mar. 30, 1954

2,673,753

UNITED STATES PATENT OFFICE 2,673,753

LOADING APPARATUS

Carl Scott, Littleton, and Harry E. Mencimer, Denver, Colo.

Application September 1, 1949, Serial No. 113,608

4 Claims. (Cl. 287—53)

1

The present invention relates to loading apparatus which may be installed upon a wheeled vehicle for transporting material or articles such as baled hay, straw, or the like, and more particularly to a quick detachable and adjustable coupling or clamping device for coupling together driving and driven members for mechanically operating the loading apparatus.

The present application is related to a co-pending application Serial No. 622,256, filed October 15, 1945, in the name of Carl Scott, now Patent No. 2,480,884, which patent is owned by the present applicants.

One of the objects of the present invention is to provide an improved loading apparatus for installation upon a wheeled vehicle, which is of new and improved construction and capable of being applied to various types of wheeled vehicles.

Another object of the present invention is to provide an improved loading apparatus having in association with it an improved coupling device capable of being clampingly mounted upon a power take-off, and having a winding drum in association therewith for use in connection with the loading apparatus.

A further object of the present invention is to provide an improved coupling device which may be quickly and easily adjusted to various diameters whereby to permit its easy application to and removal from a power take-off member, such as the hub of a truck or tractor wheel.

Another object of the present invention is to provide a coupling or clamping device in which the adjustable parts thereof are uniformly adjusted so as to provide an equalized gripping action.

A further object of the present invention is to provide an improved combined coupling and power drum for receiving a hoisting line, and one which permits the connecting together of a power take-off and a rope or cable receiving winding drum.

The foregoing objects and advantages of the present invention will appear from the following description and appended claims when considered in connection with the accompanying drawings forming a part of this specification, wherein like reference characters designate corresponding parts in the several views.

In said drawings:

Fig. 1 is a fragmentary side elevational view of a wheeled vehicle, such as a platform truck, having the present invention installed thereupon;

Fig. 2 is a fragmentary perspective view, on

Figures 2, 3, 4:
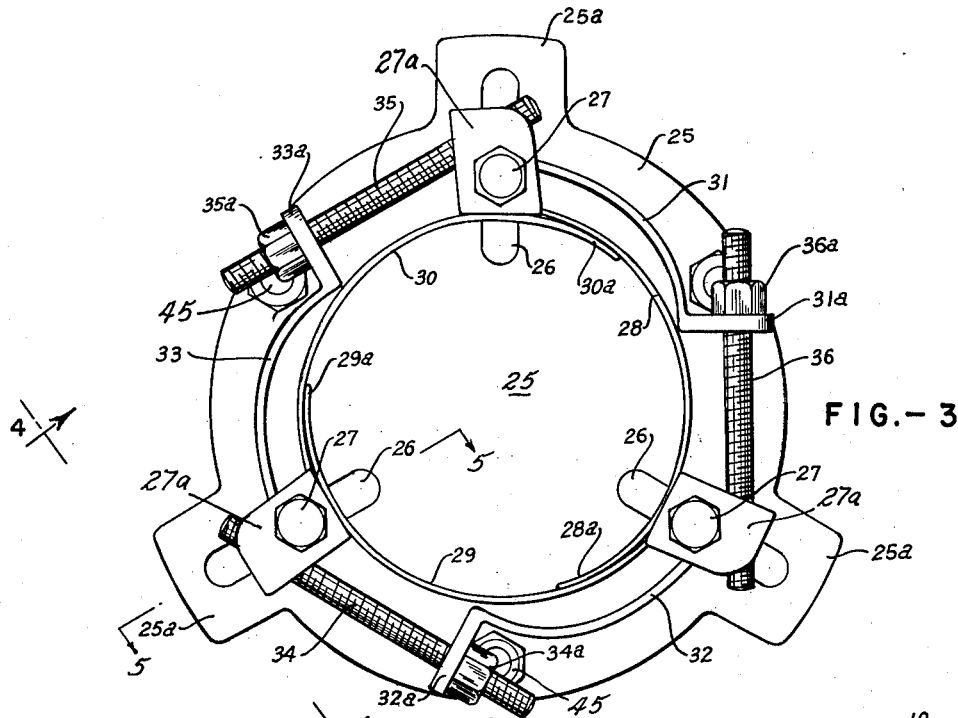

2 an enlarged scale, showing the detachable coupling assembly or unit of the present invention applied to a wheel hub of the wheeled vehicle of Fig. 1;

Fig. 3 is an elevational view looking into the clamping device of the detachable coupling assembly of the present invention; and Fig. 4 is an edge view of the device of Fig. 3, taken substantially along the line 4—4 of Fig. 3, looking in the direction of the arrows.

Fig. 5 is a fragmentary sectional view taken substantially along the line 5—5 of Fig. 3, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now particularly to Figs. 1 and 2 of the drawings, the present invention is particularly, although not exclusively, well adapted for use in connection with a platform truck, or other power vehicle, or may be associated with a tractor, if desired. There is shown, merely by way of illustration, a part of a truck platform indicated at 10, the truck having a series of supporting wheels, one of the driving wheels being indicated at 11.

In accordance with the present invention, the loading or article hoisting or lowering apparatus comprises a guide or bearing tube, such as tube 12, which is mounted in a tubular support or socket 13 carried by a suitable bracket 14 which is attached to a side of the wagon or truck platform 10. A shaft or boom 15 having a stop member 16 is telescoped within the guide or bearing tube 12 and is of such a length that both the shaft and the guide tube rest within the socket member 13 to be supported thereby. Thus, the lower end of both tube and shaft or boom extend below the truck platform 10 at a side thereof. The upper end of the boom or shaft 15 is curved or laterally ranging, as seen in Fig. 1, this portion of the boom being indicated at 17. The laterally ranging upper end or curved portion 17 carries adjacent its outer end a pulley assembly 18 and spaced somewhat inwardly from that end is a second pulley assembly 19.

The socket member 13 carries a bracket 20 which in turn supports a third pulley assembly 21, the latter assembly being disposed preferably below pulley assembly 19 and being somewhat remote from the same when the shaft or boom is in its upper or extended position as seen in full lines in Fig. 1. It will be understood that the boom may be lowered to the broken line position of the parts by removing the stop member 16. The boom may, of course, be swung from a position overlying the ground or other surface at the side of the truck platform 10 to the position in which it is shown in the drawings where it overlies the truck platform 10. The loading apparatus includes a hoist line such as a rope or cable 22 carrying a hook 23 which grips a band 24 extended around an article, such as a bale of hay H. The hoist line 22 passes over pulleys of the assemblies 18 and 19 and also the pulley of assembly 21.

The coupling device or power take-off attachment of the present invention is best shown in detail in Figs. 2, 3 and 4. It will be understood that this device or assembly is adapted to be mounted upon the hub of wheel 11, which is preferably one of the driving wheels of the truck or tractor, and has a drum-like portion carried thereby around which the hoist line 22 is passed to effect the power raising and/or lowering of the bale of hay H.

With particular reference to Figs. 3 and 4 of the drawings, the coupling device or detachable coupling assembly of the present invention comprises a base plate 25 having a series of radial slots 26 formed therein. One face of plate 25, namely the normally inner face when the assembly is in its position of use upon a take-off device, is provided with a series of adjustable bolts 27 which extend through the radial slots 26 of plate 25. A series of curved band-like sections or members (three being shown) are carried by the bracket members 27a through which the bolts 27 extend. Each of the brackets 27a has attached thereto, as by welding, and thus supports one end of one of the band-like members 28, 29 and 30. It will be seen that the free end of each of the band-like members overlaps the attached end of the next adjacent band-like member. For example, the free end portion 28a overlaps band 29; the free end portion 29a overlaps band 30; and the free end portion 30a of band 30 in turn overlaps band 28. Moreover, it will be seen that the free end portions of the bands 28, 29 and 30 overlie the inner end portions of the slots 26 and are also disposed inside the bolts 27. It will be understood that by contracting or expanding the several band-like members, the inside diameter of the clamping portion of the coupling unit may be varied.

It is desirable to expand and/or contract the band-like members 28, 29 and 30 uniformly and to accomplish this, the inner face or surface of base plate 25 has disposed thereupon three steel sections 31, 32 and 33 disposed outside the overlapping band-like sections 28, 29 and 30. One end of each of the members 31, 32 and 33 is provided with upper and lower side flanges or end portions to receive one of the bolts 27. Thus, one end of each of the members 31, 32 and 33 is supported by the same means which supports the fixed end of a band-like section. The opposite end of each of the members 31, 32 and 33 is preferably offset or turned at an angle and slotted to receive an adjusting bolt. Member 32 has its offset end 32a slotted to receive the adjusting bolt 34, which latter passes through a slot in the flange of member 33 and is held by a nut (not shown).

The outer end of member 33 is offset at 33a and has an adjusting bolt 35 passed through a slot therein and held in position by a nut 35a, similar to nut 34a of the preceding member. The opposite end of adjusting bolt 35 passes through the flanged end of member 31 and is held in relation thereto by a second nut (not shown). In like manner, member 31 has an offset end portion 31a with a slot formed therein to receive adjusting bolt 36 held in association with the member 31a by a nut 36a. This adjusting bolt passes through a slot formed in the flanged end of member 32 and is held in adjusted relation with respect to said member by means of another nut (not shown).

It will be understood that the diameter between the inner face of the overlapping band-like members or sections 28, 29 and 30 may be varied uniformly by virtue of the adjusting bolts 34, 35 and 36, and the supporting transversely extending bolts 27 which are located in the radial slots 26.

By adjusting the nuts on the adjustment bolts 34, 35 and 36, the members or segments 31, 32 and 33 will be shifted inwardly by contracting these members into a smaller circle than that shown in Fig. 3, such contraction causing a shifting of the bolts 27 inwardly toward the inner ends of the radial slots 26. After the overlapping band-like members or shoes have been contracted to the proper position to clampingly or grippingly engage, for example, a power take-off device, such as a wheel hub, the bolts 27 are preferably tightened down to hold the entire assembly on the inner face of plate 25 in adjusted position with respect to said plate.

Assuming that the device of Figs. 3 and 4 has been clampingly applied to the hub of wheel 11, with the ears or outer projections 25a only being visible in Fig. 2, the device is now in readiness to receive the frusto-conical member 40, also seen in Fig. 2. The frusto-conical member has an inturned annular flange (not shown) which is provided with spaced holes or slots (three such preferably being employed) to register with the threaded studs carried by the outer or opposite face of base plate 25, such as the studs 45 of Fig. 4. There are actually three such studs which may be seen in Fig. 1, although only two of them are shown in Fig. 4. These threaded studs are removed from plate 25 and the frusto-conical member is applied to the outer face of the plate, whereupon the three studs 45 are replaced in their threaded openings (not shown) in plate 25 to clamp the inner flange of member 40 firmly to the plate. Thus, member 40 becomes a detachable yet provisionally integral part of the coupling assembly.

As seen in Fig. 2 of the drawings, the outer end portion of frusto-conical member 40 terminates in a cylindrical portion or drum 50, there being a concave surface on the outer periphery of the drum, with a rib or flange 51 separating the drum proper from the frusto-conical member 40. The members 40 and 50 may be formed as a single piece or, if desired, both members may be provided with adjacent flanges to permit them to be secured together by bolts or, if desired, the flanges may be welded or riveted together to form an integral structure.

It will be understood that the coupling device or assembly including the clamping members for engagement with the wheel hub or other power take-off, the frusto-conical outer extension, and the drum 50 together form a rigid unit which is detachably mounted upon the wheel hub for rotation with the wheel.

It will be readily understood that if it is desired to raise or lower the bale of hay H shown in Fig. 1, it is merely necessary for the operator to grasp the free end of the hoist line, such as the rope or cable 22, which has been passed around the winding drum 50 and which extends over the pulleys previously referred to, hold said end of the rope, while the vehicle is moved forwardly or backwardly under its own power to either wind or unwind the hoist line, thereby either raising or lowering the bale of hay.

The coupling device or assembly of the present invention is capable of being attached to various size hubs of trucks, tractors, or the like or of being applied to any suitable take-off device to transmit power from said device to some other mechanism such, for example, as some suitable loading apparatus or device.

The invention is broader in its scope than use in connection with loading apparatus or equipment. The device shown in Figs. 3 and 4 is capable of use in various other ways as a clamping device. As a matter of fact, the adjustable parts illustrated in Fig. 3 of the drawings may be used satisfactorily as a hose clamping device, for example.

We claim:

1. In a coupling device for connecting a power take-off and a winding drum, a base plate having on one face a plurality of relatively adjustable gripping band sections having overlapping end portions each mounted at one of its ends upon said face of the plate with the opposite end thereof being unattached to said plate, means for contracting and/or expanding said overlapping sections to vary the inside diameter of the plurality of sections to hold the device in operative relationship upon the power take-off, a frusto-conical member detachably mounted upon the other face of the base plate, and means for detachably mounting said frusto-conical member upon said base plate, said frusto-conical member having a drum-like peripheral surface at its outer end for receiving a rope or cable of a hoist device.

2. In a detachable coupling device for connecting a power-driven wheel with a loading apparatus, a base plate having on one face a plurality of relatively adjustable overlapping band-like sections each mounted at one of its ends upon said face of the plate, means for contracting and/or expanding said band-like members to vary their collective inside diameter to fit wheel hubs of different diameters, said means serving to hold the device in clamping engagement with a wheel hub, a frusto-conical member detachably mounted upon the other face of the base plate and extending outwardly therefrom, means for detachably mounting said frusto-conical member upon said base plate, and a drum-like surface disposed at the outer end of the frusto-conical member for receiving a hoisting line of the loading apparatus.

3. A coupling device for connecting together driving and driven members, comprising a base plate having on one face a plurality of relatively adjustable overlapping gripping band sections, means for mounting each thereof at one of its ends upon said face of the plate, said plate having radial slots formed therein through which the mounting means for the gripping band sections extend, means for uniformly contracting and/or expanding said overlapping sections to vary their collective inside diameter whereby to permit the coupling device to be clampingly engaged with driving means of various diameters, a frusto-conical member detachably mounted upon the other face of the base plate, means for detachably mounting said frusto-conical member upon said base plate, and a drum-like member at the outer end of the frusto-conical member providing the driven member of the device.

4. In a coupling device, a base plate having on one face thereof a plurality of relatively adjustable overlapping band-like sections, means for mounting an end of each of said sections upon said face of the plate with the opposite end thereof being unattached to said plate, the base plate having substantially radial slots formed therein through which said mounting means extend, and means mounted upon the said face of the base plate and disposed outside said overlapping band-like sections for uniformly contracting and/or expanding said sections whereby to vary the collective inside diameter of the sections of the coupling device.

CARL SCOTT.
HARRY E. MENCIMER.

References Cited in the file of this patent

UNITED STATES PATENTS

| Number | Name | Date |
|---|---|---|
| 64,482 | Bullis | May 7, 1867 |
| 78,566 | Barker | June 2, 1868 |
| 753,219 | Bailey | Mar. 1, 1904 |
| 841,404 | Jay | Jan. 15, 1907 |
| 1,228,398 | Brock | June 5, 1917 |
| 1,394,177 | Jones | Oct. 18, 1921 |
| 1,424,577 | Martin | Aug. 1, 1922 |
| 1,568,101 | Taylor | Jan. 5, 1926 |
| 1,992,322 | Nuff et al. | Feb. 26, 1935 |
| 2,447,299 | Williams | Aug. 17, 1948 |
| 2,472,307 | Nagel | June 7, 1949 |
| 2,480,884 | Scott | Sept. 6, 1949 |
| 2,487,305 | Bridegroom | Nov. 8, 1949 |